United States Patent
Chen et al.

(10) Patent No.: US 9,261,886 B2
(45) Date of Patent: Feb. 16, 2016

(54) METHOD AND SYSTEM FOR MONITORING TEMPERATURE AND HUMIDITY OF WAREHOUSES

(75) Inventors: Zenghong Chen, Guandong (CN); Chunhao Wu, Guandong (CN); Kunhsien Lin, Guandong (CN); Xiande Li, Guandong (CN); Yongqiang Wang, Guandong (CN); Weibing Yang, Guandong (CN); Minghu Qi, Guandong (CN); Zhenhua Guo, Guandong (CN); Yunshao Jiang, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 557 days.

(21) Appl. No.: 13/634,874

(22) PCT Filed: Aug. 17, 2012

(86) PCT No.: PCT/CN2012/080275
§ 371 (c)(1),
(2), (4) Date: Sep. 14, 2012

(87) PCT Pub. No.: WO2014/026369
PCT Pub. Date: Feb. 20, 2014

(65) Prior Publication Data
US 2014/0048609 A1 Feb. 20, 2014

(30) Foreign Application Priority Data
Aug. 14, 2012 (CN) .......................... 2012 1 0288439

(51) Int. Cl.
*G05D 22/02* (2006.01)
*G05D 23/19* (2006.01)
*H04Q 9/00* (2006.01)
*F24F 11/00* (2006.01)

(52) U.S. Cl.
CPC ............ *G05D 22/02* (2013.01); *F24F 11/0086* (2013.01); *G05D 23/1928* (2013.01); *H04Q 9/00* (2013.01)

(58) Field of Classification Search
CPC ............................... G05D 22/02; G05D 23/19
USPC .................................. 236/1 C, 51; 62/63, 378
See application file for complete search history.

(56) References Cited

U.S. PATENT DOCUMENTS

| | | | | |
|---|---|---|---|---|
| 5,741,072 | A * | 4/1998 | Yamaguchi et al. | 374/179 |
| 7,058,477 | B1 * | 6/2006 | Rosen | 700/277 |
| 2003/0221821 | A1 * | 12/2003 | Patel et al. | 165/247 |
| 2012/0176954 | A1 * | 7/2012 | Hey et al. | 370/315 |

FOREIGN PATENT DOCUMENTS

| | | |
|---|---|---|
| CN | 102004479 A | 4/2011 |
| WO | WO2004107770 A2 | 12/2004 |

* cited by examiner

*Primary Examiner* — Jonathan Bradford
(74) *Attorney, Agent, or Firm* — Andrew C. Cheng

(57) ABSTRACT

A method and system for monitoring the temperature and humidity of warehouses are disclosed. The method includes: installing a detecting module in a cartridge, transporting the cartridge to a plurality of storages of the warehouse by a transmission assembly so as to measure the temperature and humidity of each of the storages by the detecting module, transmitting the measured results to a control unit by a wireless network, and dynamically monitoring the temperature and humidity of the warehouses according to the measured results by the control unit. The method and the system not only control and adjust the temperature and humidity of each of the storages of the warehouses in time, but also reduce detection cost.

6 Claims, 5 Drawing Sheets

METHOD AND SYSTEM FOR MONITORING TEMPERATURE AND HUMIDITY OF WAREHOUSES

BACKGROUND OF THE INVENTION

1. Field of the Invention

Embodiments of the present disclosure relate to monitoring technology, and more particularly to a method and system for monitoring the temperature and humidity of warehouses.

2. Discussion of the Related Art

In liquid crystal panel fields, the glass panels are arranged in storages in the warehouse. Generally, during the manufacturing and testing processes, the glass panels are transported by automation devices, and thus alterations of the temperature and humidity of the storages seriously affects the above processes. During the CVF coating processes, the alterations in temperature and humidity may increase the defective rate. During the testing processes of the glass panels, the alternations in temperature and humidity may result in errors or some glass panels may be omitted from the testing process. Thus, it is very important to precisely monitor the change of the temperature and humidity of the warehouses.

Currently, temperature-humidity sensors are installed on certain spots in the warehouses to monitor the temperature and humidity of the warehouses. However, as the measurements are conducted only for certain spots, the measured results may represent the temperature and humidity within a specific range, which is different from the average value of the temperature and humidity of the whole warehouse. In addition, it is necessary to install the temperature-humidity sensors in every warehouse and thus the cost is relatively high.

In view of the above, a method and system for monitoring the temperature and humidity of warehouses are needed.

SUMMARY

The object of the claimed invention is to provide a method and a system for effectively monitoring the temperature and humidity of the warehouses. The method and the system not only control and adjust the temperature and humidity of each of the storages of the warehouses in time, but also reduce detection cost.

In one aspect, a method for monitoring temperature and humidity of warehouses includes: installing a detecting module in a cartridge; transporting the cartridge to a plurality of storages of the warehouse by a transmission assembly so as to measure the temperature and humidity of each of the storages by the detecting module; transmitting the measured results to a control unit by a wireless network; dynamically monitoring the temperature and humidity of the warehouses according to the measured results by the control unit; wherein the detecting module is installed on a bottom surface of the cartridge, and the detecting module includes a temperature-humidity sensor, an analog to digital converter (ADC), a wireless local area network (WLAN) serial service device, and a power supply that are electrically connected; wherein the power supply supplies power to the temperature-humidity sensor, ADC, and the WLAN serial service device; the temperature-humidity sensor measures the temperature and humidity of the storages and transmits the measured results by simulation signals to the ADC; the ADC transforms the simulation signals to digital signals and transmits the digital signals to the WLAN serial service device; the WLAN serial service device transmits the digital signals to the control unit by wireless transmission; wherein at least one wireless base station is arranged within the warehouse, and as forwarder is arranged between two warehouses so as to establish the wireless network.

The transmission assembly transports the cartridge to each of the storages one by one so as to measure the temperature and humidity of all of the storages by the detecting module.

The dynamically monitoring step further includes: saving the measured results of the temperature and humidity of the storages by the control unit; calculating and obtaining an average value of the temperature and humidity of the storages and determining if the average value of the temperature and humidity of the storages is within a predetermined threshold range; and adjusting the temperature and humidity of the storages to be within the predetermined threshold range upon determining the average value of the temperature and humidity of the storages is not within the predetermined threshold range.

The dynamically monitoring step further includes: saving the measured results of the temperature and humidity of the storages by the control unit, and determining if the temperature and humidity of the storages is within the predetermined threshold range; and adjusting the temperature and humidity of the storages to be within the predetermined threshold range upon determining the temperature and humidity of the storages is not within the predetermined threshold range.

In another aspect, a method for monitoring temperature and humidity of warehouses includes: installing a detecting module in a cartridge; transporting the cartridge to a plurality of storages of the warehouse by a transmission assembly so as to measure the temperature and humidity of each of the storages by the detecting module; transmitting the measured temperature and humidity of the storages to a control unit by a wireless network; and dynamically monitoring the temperature and humidity of the warehouses according to the measured temperature and humidity of each of the storages by the control unit.

The detecting module is installed on a bottom surface of the cartridge, and the detecting module includes a temperature-humidity sensor, an analog to digital converter (ADC), a wireless local area network (WLAN) serial service device, and a power supply that are electrically connected. The power supply supplies power to the temperature-humidity sensor, the ADC, and the WLAN serial service device. The temperature-humidity sensor measures the temperature and humidity of the storages and transmits the measured results by simulation signals to the ADC. The ADC transforms the simulation signals to digital signals and transmits the digital signals to the WLAN serial service device. The WLAN serial service device transmits the digital signals to the control unit by wireless transmissions.

At least one wireless base station is arranged within the warehouse, and a forwarder is arranged between two warehouses so as to establish the wireless network.

The transmission assembly transports the cartridge to each of the storages one by one so as to measure the temperature and humidity of all of the storages by the detecting module.

The dynamically monitoring step further includes: saving the measured results of the temperature and humidity of the storages by the control unit; calculating and obtaining the average value of the temperature and humidity of the storages and determining if the average value of the temperature and humidity of the storages is within a predetermined threshold range; and adjusting the temperature and humidity of the storages to be within the predetermined threshold range upon determining the average value of the temperature and humidity of the storages is not within the predetermined threshold range.

The dynamically monitoring step further includes: saving the measured results of the temperature and humidity of the storages by the control unit, and determining if the temperature and humidity of the storages is within the predetermined threshold range; and adjusting the temperature and humidity of the storages to be within the predetermined threshold range upon determining the temperature and humidity of the storages is not within the predetermined threshold range.

In another aspect, a system for monitoring temperature and humidity of warehouses is disclosed. The system includes the warehouses including a plurality of storages, a cartridge installed with a detecting module, and a transmission assembly for transporting the cartridge to a plurality of storages so as to measure the temperature and humidity of the storages by the detecting module. The detecting module transmits the measured results to a control unit by a wireless network. The control unit dynamically monitors the temperature and humidity of the warehouses according to the measured results.

The detecting module is installed on a bottom surface of the cartridge, and the detecting module includes a temperature-humidity sensor, an analog to digital converter (ADC), a wireless local area network (WLAN) serial service device, and a power supply that are electrically connected.

The power supply supplies power to the temperature-humidity sensor, the ADC, and the WLAN serial service device. The temperature-humidity sensor measures the temperature and humidity of the storages and transmits the measured results by simulation signals to the ADC. The ADC transforms the simulation signals to digital signals and transmits the digital signals to the WLAN serial service device. The WLAN serial service device transmits the digital signals to the control unit by wireless transmission.

At least one wireless base station is arranged within the warehouse, and a forwarder is arranged between two warehouses so as to establish the wireless network.

The transmission assembly transports the cartridge to each of the storages one by one so as to measure the temperature and humidity of all of the storages by the detecting module.

DETAILED DESCRIPTION OF THE EMBODIMENTS

Embodiments of the invention will now be described more fully hereinafter with reference to the accompanying drawings, in which embodiments of the invention are shown.

Figure 1:
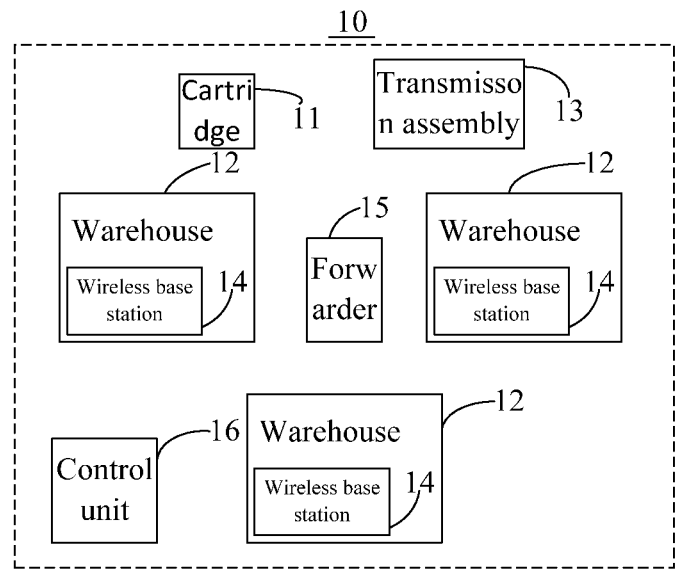
FIG. 1 is a schematic diagram of the system for monitoring the temperature and humidity of warehouses of one embodiment.
Figure 2:
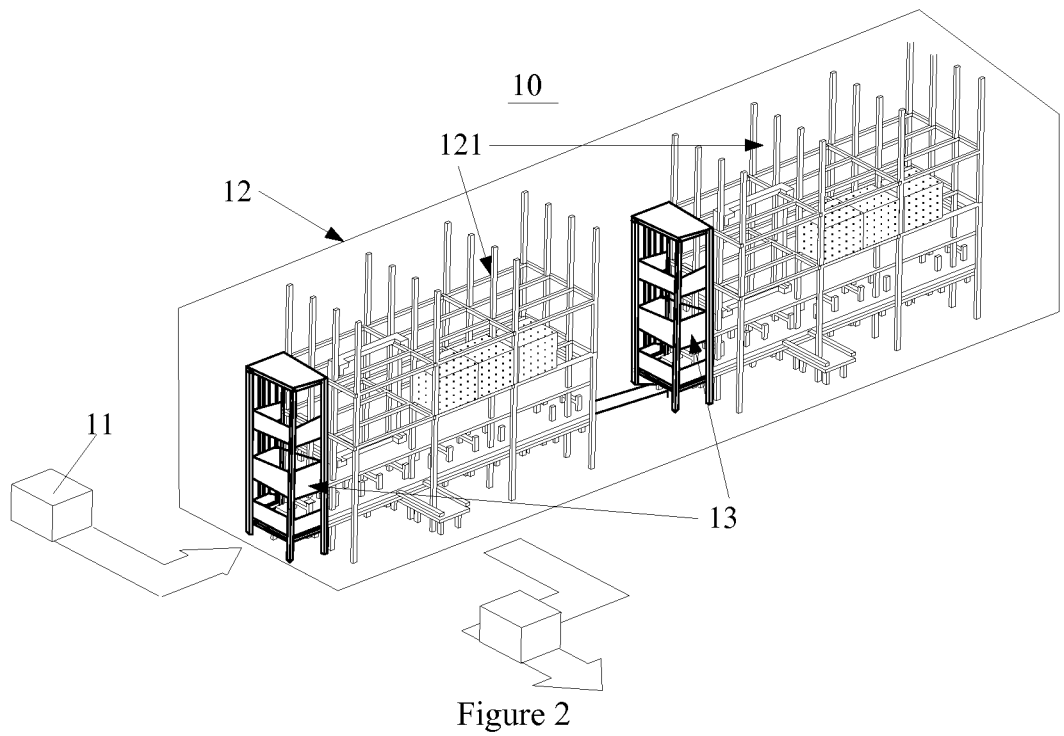
FIG. 2 is a partial isometric diagram of the system for monitoring the temperature and humidity of warehouses.

FIG. 1 is a schematic diagram of the system for monitoring the temperature and humidity of a warehouse ("the monitoring system 10") of one embodiment. The monitoring system 10 includes a cartridge 11, a transmission assembly 13, a plurality of warehouses 12, a wireless base station 14, a forwarder 15 and a control unit 16. FIG. 2 is a partial isometric diagram of the monitoring system 10. The warehouses 12 include a plurality of storages 121. The transmission assembly 13 transports the cartridge 11 to the storages 121 of the warehouses 12. The cartridge 11 includes a detecting module (not shown) for measuring temperature and humidity of the storages 121.

In the embodiment, preferably, the cartridge 11 is cubic so that the cartridge 11 may be transported easily by the transmission assembly 13 and the cartridge 11 may be arranged easily within the storages 121. In other embodiments, the cartridge 11 may be rectangular-shaped or other shape.

Figure 3:
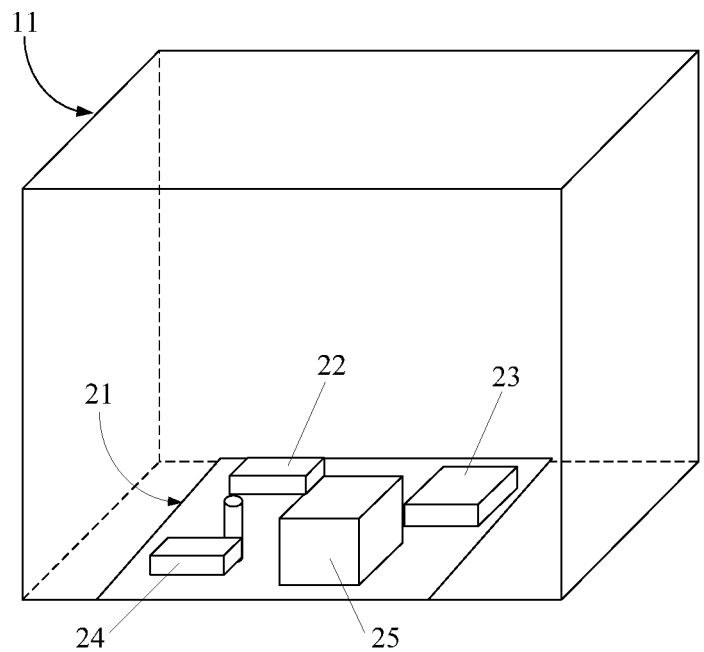
FIG. 3 is an isometric diagram of the cartridge one embodiment.

FIG. 3 is an isometric diagram of the cartridge 11 according to one embodiment. The cartridge 11 includes the detecting module 21 installed on a bottom surface of the cartridge 11. The detecting module 21 includes a temperature-humidity sensor 22, an analog to digital converter (ADC) 23, a wireless local area network (WLAN) serial service device 24 and a power supply 25.

Figure 4:
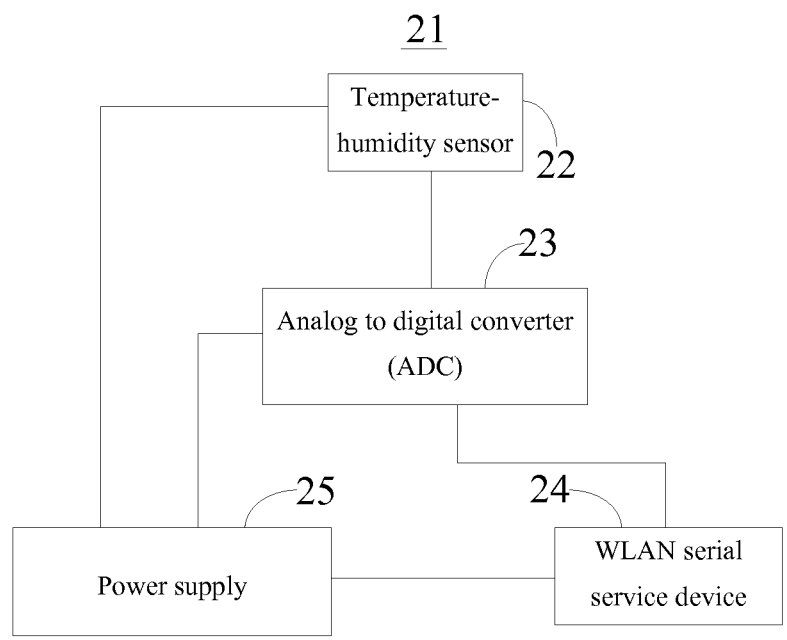
FIG. 4 is a circuit diagram of the detecting module of one embodiment.

FIG. 4 is a circuit diagram of the detecting module according to one embodiment. The power supply 25 connects to each of the temperature-humidity sensor 22, the ADC 23, and the WLAN serial service device 24 for supplying the power to the above components. The power supply 25 may be lithium-polymer battery or other power-saving batteries. The temperature-humidity sensor 22 connects with the ADC 23, and the ADC 23 connects with the WLAN serial service device 24.

In the embodiment, the temperature-humidity sensor 22 measures the temperature and humidity of each of the storages 121 and transmits the measured results by simulation signals to the ADC 23. The ADC 23 transforms the simulation signals to digital signals recognized by computers, and transmits the digital signals to the WLAN serial service device 24. The WLAN serial service device 24 receives the digital signals and transmits the digital signals to the control unit 16 by wireless transmissions.

In the embodiment, in order to precisely measure the temperature and the humidity, the temperature-humidity sensor 22, the ADC 23, the WLAN serial service device 24 and the power supply 25 are arranged on the bottom surface or the cartridge 11. In addition, the temperature-humidity sensor 22 is not arranged in the vicinity of the power supply 25 to prevent the measurement results from being affected by the heat generated by the power supply 25.

In one embodiment, the temperature-humidity sensor 22 may be a digital temperature-humidity sensor. The temperature and humidity measured by the digital temperature-humidity sensor may be transformed to be digital signals directly. The digital signals are then transmitted to the WLAN serial service device 24. Comparing to the detecting module shown in FIG. 3, the ADC 23 is not needed in this embodiment.

As shown in FIG. 1, the wireless base station 14 is arranged within the warehouses 12, and the forwarder 15 is arranged between two warehouses 12. The control unit 16, for example, may be a computing device arranged outside of the warehouses 12. At least one wireless base station 14 may be arranged in the monitoring system 10 according to the distances between the warehouses 12. The temperature and humidity of the storages 121 measured by the detecting module 21 are transmitted to the control unit 16 by the wireless network established by the base stations 14 and the forwarder 15. The control unit 16 is configured to dynamically monitor the temperature and humidity of the warehouses 12 according to the measured results.

Figure 5:
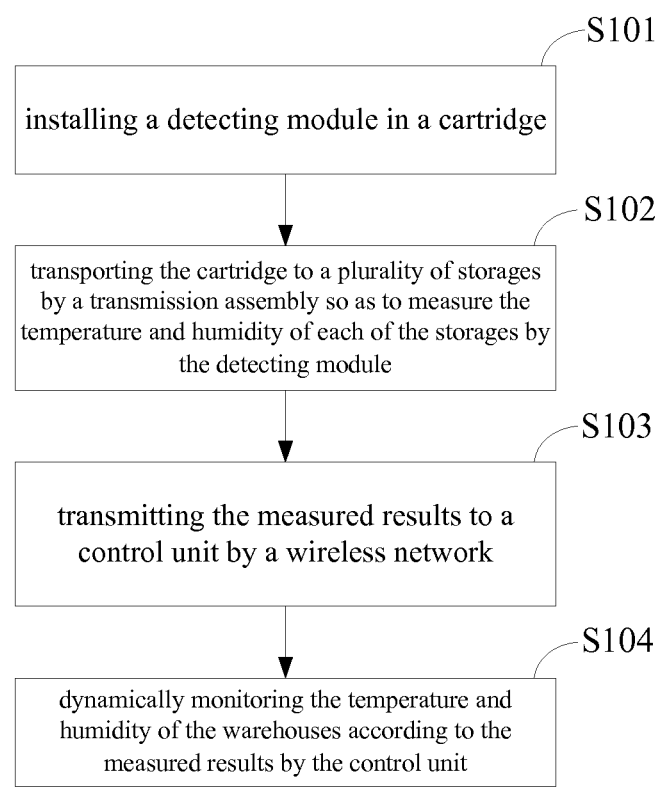
FIG. 5 is a schematic diagram illustrating the method for monitoring the temperature and humidity of warehouses of one embodiment.

FIG. 5 is a schematic diagram illustrating the method for monitoring the temperature and humidity of warehouses ("the monitoring method") of one embodiment. The monitoring method includes the following steps. In step S101, the detecting module is installed within the cartridge 11. The airs flow between the outside and inside of the cartridge 11 so that the temperature and humidity are the same between the outside and inside of the cartridge 11.

In step S101, the transmission assembly 13 transports the cartridge 11 to the storages 121 so as to measure the temperature and humidity of the storages 121 by the detecting module 21.

The warehouses 12 include the plurality of storages 121 for depositing glass panels or other panels. In step S102, after the cartridge 11 is transported to the storage 121, the detecting module 21 of the cartridge 11 measures the temperature and humidity of the storages 121 one by one until the cartridge 11 is transported to each of the storages 121 and the temperature and humidity of each of the storages 121 are measured.

In step S103, the measured temperature and humidity of each of the storages 121 are transmitted to the control unit 16 by the wireless network.

In step S104, the control unit 16 dynamically monitors the temperature and humidity of the warehouses 12 according to the measured results. The control unit 16 may adjust the temperature and humidity by a specific controller. The specific controller connects with the control unit 16 by electrical connections or by near field communications.

In step S104, the control unit 16 not only dynamically monitors the temperature and humidity of the warehouses 12 by an average value of temperature and humidity of each of the storages 121, but also monitors the storages 121 with changed temperature and humidity. The detail mechanisms will now be described, more fully hereinafter with reference to FIGS. 6 and 7.

Figure 6:
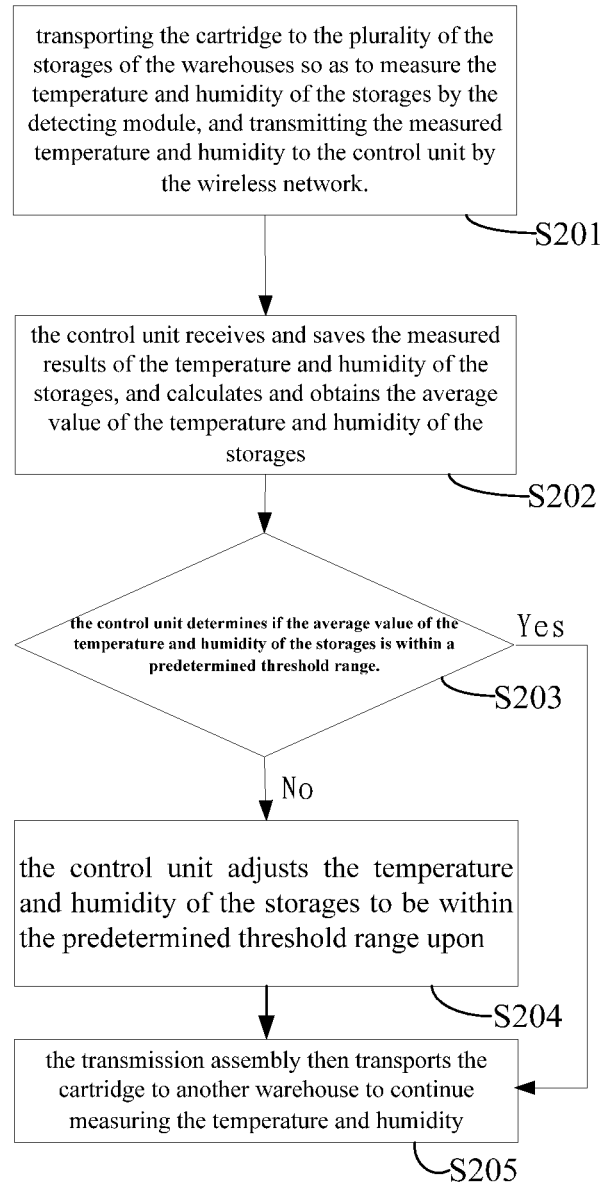
FIG. 6 is a flowchart illustrating the method for monitoring the temperature and humidity of warehouses of another embodiment.

FIG. 6 is a flowchart illustrating the method for monitoring temperature and humidity of warehouses according to one embodiment. The control unit 16 dynamically monitors the average value of the temperature and humidity of each of the storages 121 of the warehouses 12. The method includes the following steps.

In step S201, the transmission assembly 13 transports the cartridge 11 to the plurality of the storages 121 of the warehouses 12 so as to measure the temperature and humidity of the storages 121 by the detecting module 21, and the measured temperature and humidity are transmitted to the control unit 16 by the wireless network.

The measurement may be conducted for several representative storages 121 of the warehouses 12. For example, as the temperature and humidity of adjacent storages 121 may be quite similar, the measurements may be conducted only for storages 121 that are spaced apart from each other, such as the storages 121 arranged on the first, third, fifth layers, or the storages 121 arranged on the second, the fourth layers. It is understood that the storages 121 may be selected by different criteria according to real scenarios.

In the embodiment, preferably, the temperature and humidity of all of the storages 121 are measured by the detecting module 21, and the measured results are transmitted to the control unit 16 by the wireless network.

In step S202, the control unit 16 receives and saves the measured results of the temperature and humidity of the storages 121, and calculates and obtains the average value of the temperature and humidity of the storages 121.

In step S203, the control unit 16 determines if the average value of the temperature and humidity of the storages 121 is within a predetermined threshold range. The predetermined threshold range may be determined by a proper range adopted in general manufacturing and testing processes of the glass panels.

In step S204, the control unit 16 adjusts the temperature and humidity of the storages 121 to be within the predetermined threshold range upon determining the average value of the temperature and humidity of the storages 121 is not within the predetermined threshold range. If the average value of the temperature and humidity of the storages 121 is within the predetermined threshold range, step S205 is executed.

In step S205, if the average value of the temperature and humidity of the storages 121 is within the predetermined threshold range, the control unit 16 stops monitoring. The transmission assembly 13 then transports the cartridge 11 to another warehouse 12 to continue measuring the temperature and humidity of another warehouse 12. In view of the above, the monitoring method as shown in FIG. 6 may precisely calculate the average value of the temperature and humidity of each of the warehouses 12 in time so as to effectively adjust the temperature and humidity of each of the warehouses 12.

Figure 7:
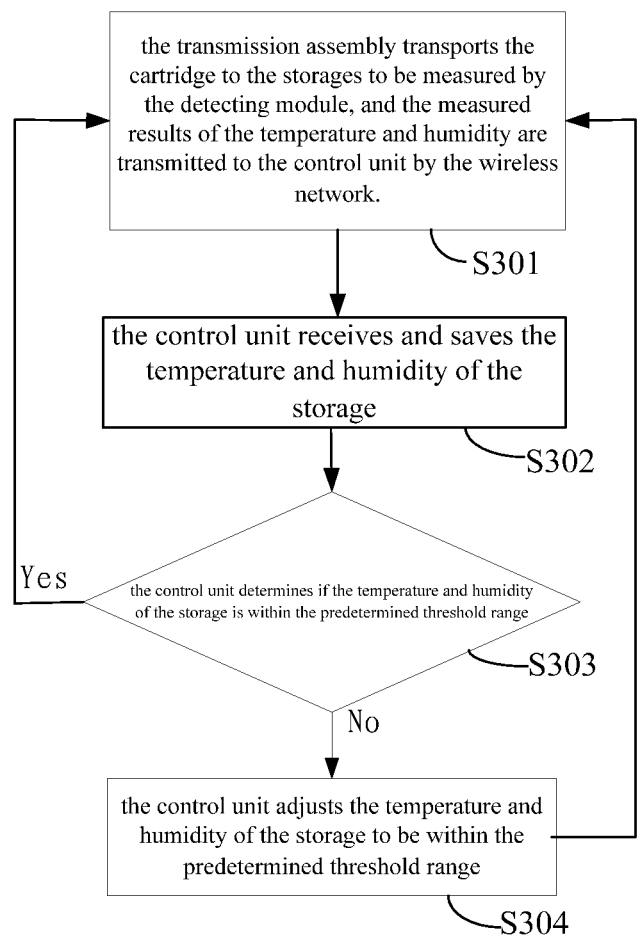
FIG. 7 is a flowchart illustrating the method for monitoring the temperature and humidity of warehouses of another embodiment.

FIG. 7 is a flowchart illustrating the method for monitoring the temperature and humidity of warehouses of another embodiment. The control unit 16 dynamically monitors the temperature and humidity of each of the storages 121. The monitoring method of FIG. 7 includes the following steps. In step S301, the transmission assembly 13 transports the cartridge 11 to the storages 121 to be measured by the detecting module 21. The measured results of the temperature and humidity are transmitted to the control unit 16 by the wireless network.

In step S302, the control unit 16 receives and saves the temperature and humidity of the storage 121. In step S303, the control unit 16 determines if the temperature and humidity of the storage 121 is within the predetermined threshold range. If the temperature and humidity of the storage 121 is not within the predetermined threshold range, in step S304, the control unit 16 adjusts the temperature and humidity of the storage 121 to be within the predetermined threshold range. In step S303, if the temperature and humidity of the storage 121 is within the predetermined threshold range, the process returns to step S301.

The monitoring method as shown in FIG. 7 may dynamically measure the temperature and humidity of each of the storages 121 so that the storages 121 with changed temperature and humidity may be easily detected and be adjusted in time.

In view of the above, the transmission assembly 13 transports the cartridge 11 to each of the storages 121 of the warehouses 12. The detecting module 21 of the cartridge 11 may dynamically measure the temperature and humidity of each of the storages 121 so as to calculate the average value of the temperature and humidity of each of the warehouses 12 in time. Therefore, the temperature and humidity of each of the warehouses 12 may be control led and adjusted.

In addition, the control unit 16 may dynamically measure the temperature and humidity of each of the storages 121 so as to detect the storages 121 with changed temperature and humidity. The temperature and humidity of the storages 121 may be controlled by the measured results. As a result, the detective free rate of products and the monitoring cost are reduced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A method for monitoring temperature and humidity of warehouses, comprising;

installing a detecting module in a cartridge;

transporting the cartridge to a plurality of the storages one by one by a transmission assembly so as to measure the temperature and humidity of each of storages by the detecting module, wherein a shape of the cartridge is configured to be the same with the storage such that the cartridge is arranged within the storage;

transmitting the measured results to a control unit by a wireless network;

a dynamically monitoring step comprising adjusting the temperature and the humidity of the current storage to be within a predetermined threshold range upon determining the temperature and the humidity of the current storage is not within the predetermined threshold range, and transporting the cartridge from the current storage to another storage to be measured upon determining the temperature and the humidity of the current storage is within the predetermined threshold range;

wherein the detecting module is configured within the cartridge, and the detecting module comprises a temperature-humidity sensor, an analog to digital converter (ADC), a wireless local area network (WLAN) serial service device, and a power supply that are electrically connected;

wherein the power supply supplies power to the temperature-humidity sensor, ADC, and the WLAN serial service device;

the temperature-humidity sensor measures the temperature and humidity of the storages and transmits the measured results by simulation signals to the ADC;

the ADC transforms the simulation signals to digital signals and transmits the digital signals to the WLAN serial service device;

the WLAN serial service device transmits the digital signals to the control unit by wireless transmission;

wherein at least one wireless base station is arranged within the warehouse, and a forwarder is arranged between two warehouses so as to establish the wireless network.

2. The method as claimed in claim 1, wherein the dynamically monitoring step further comprises:

saving the measured results of the temperature and humidity of the storages by the control unit; and calculating and obtaining an average value of the temperature and humidity of the storages and determining if the average value of the temperature and humidity of the storages is within a predetermined threshold range.

3. The method as claimed in claim 1, wherein the dynamically monitoring step further comprises:

saving the measured results of the temperature and humidity of the storages by the control unit.

4. A system for monitoring temperature and humidity of warehouses, the warehouses comprising a plurality of storages, comprising:

a cartridge installed with a detecting module;

a transmission assembly for transporting the cartridge to each of the storages so as to measure the temperature and humidity of each of the storages by the detecting module, wherein a shape of the cartridge is configured to be the same with the storage such that the cartridge is arranged within the storage;

wherein the detecting module transmits the measured results to a control unit by a wireless network; and the control unit adjusts the temperature and the humidity of the current storage to be within a predetermined threshold range upon determining the temperature and the humidity of the current storage is not within a predetermined threshold range, and the control unit transports the cartridge from the current storage to another storage to be measured upon determining the temperature and the humidity of the current storage is within the predetermined threshold range.

5. The system as claimed in claim 4, wherein the detecting module is installed on a bottom surface of the cartridge, and the detecting module comprises a temperature-humidity sensor, an analog to digital converter (ADC), a wireless local area network (WLAN) serial service device, and a power supply that are electrically connected;

wherein the power supply supplies power to the temperature-humidity sensor, the ADC, and the WLAN serial service device;

the temperature-humidity sensor measures the temperature and humidity of the storages and transmits the measured results by simulation signals to the ADC;

the ADC transforms the simulation signals to digital signals and transmits the digital signals to the WLAN serial service device; and the WLAN serial service device transmits the digital signals to the control unit by wireless transmission.

6. The system as claimed in claim 4, wherein at least one wireless base station is arranged within the warehouse, and a forwarder is arranged between two warehouses so as to establish the wireless network.

* * * * *